(12) United States Patent
Chalhoub et al.

(10) Patent No.: US 7,644,984 B2
(45) Date of Patent: Jan. 12, 2010

(54) SIDE SHIELD FOR MOTOR VEHICLE SEAT ASSEMBLY

(75) Inventors: George M. Chalhoub, Northville, MI (US); Vikas Bhatia, South Lyon, MI (US); Michael A. Zielinski, Novi, MI (US); Michael J. Sweers, Williamston, MI (US); Hideki Kobayashi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/972,066

(22) Filed: Jan. 10, 2008

(65) Prior Publication Data
US 2009/0179472 A1   Jul. 16, 2009

(51) Int. Cl.
*A47C 31/00* (2006.01)
(52) U.S. Cl. ...... 297/182; 297/219.1; 297/113
(58) Field of Classification Search ........ 297/182, 297/219.1, 411.3, 411.32, 411.46, 113
See application file for complete search history.

(56) References Cited

U.S. PATENT DOCUMENTS

| | | | | |
|---|---|---|---|---|
| 1,732,116 A | * | 10/1929 | Boller | 297/113 X |
| 1,802,620 A | * | 4/1931 | Scully | 297/113 |
| 1,835,049 A | * | 12/1931 | Hottel | 297/113 |
| 1,896,477 A | * | 2/1933 | Boller | 297/113 X |
| 2,006,883 A | * | 7/1935 | Davies et al. | 312/235.6 |
| 2,160,282 A | * | 5/1939 | Rehg | 312/235.6 |
| 2,278,749 A | * | 4/1942 | Todd | 297/113 |
| 2,510,656 A | * | 6/1950 | Randel | 5/513 |
| 2,524,909 A | * | 10/1950 | Hines | 312/235.6 |
| 2,633,180 A | * | 3/1953 | Reed | 312/235.6 |
| 2,646,107 A | * | 7/1953 | Murphy | 297/113 |
| 2,668,582 A | * | 2/1954 | Goodfellow | 297/411.24 |
| 2,678,682 A | * | 5/1954 | Thomas | 312/235.6 |
| 2,692,638 A | * | 10/1954 | Castell | 312/235.6 |
| 2,704,114 A | * | 3/1955 | Williams | 297/188.16 |
| 2,836,229 A | * | 5/1958 | Spetner | 297/182 |
| 2,934,391 A | * | 4/1960 | Bohnett | 312/293.2 |
| 3,338,629 A | * | 8/1967 | Drees | 312/235.8 |
| 3,428,357 A | * | 2/1969 | Lueck | 296/24.34 |
| 3,506,301 A | * | 4/1970 | Van Santen | 297/113 |
| 3,873,010 A | * | 3/1975 | Patterson | 224/275 |
| 3,909,063 A | * | 9/1975 | Bonisch et al. | 297/113 |
| 4,106,829 A | * | 8/1978 | Dolle et al. | 312/235.8 |
| 4,560,203 A | * | 12/1985 | Huber | 297/113 X |
| 4,708,385 A | | 11/1987 | Kondo | |
| 4,722,571 A | | 2/1988 | Sweers | |
| D295,245 S | * | 4/1988 | Parsson et al. | D6/491 |
| 4,938,401 A | * | 7/1990 | Weisbrodt et al. | 224/275 |
| 4,948,195 A | * | 8/1990 | Saunders | 297/182 |
| 4,958,877 A | | 9/1990 | Lezotte et al. | |
| 4,960,293 A | * | 10/1990 | Bottinick et al. | 280/749 |
| 4,998,772 A | | 3/1991 | Safran et al. | |

(Continued)

*Primary Examiner*—Rodney B White
(74) *Attorney, Agent, or Firm*—Gifford, Krass, Sprinkle, Anderson & Citkowski, P.C.

(57) ABSTRACT

A cover conceals a portion of a gap formed between an adjacent pair of seat backs of a motor vehicle seat assembly. The cover includes a substantially rigid portion and a substantially flexible portion. The flexible portion of the cover has first and second flanges that extend outwardly from opposite sides of the substantially rigid portion for concealing a portion of the gap between the seat backs of the seat assembly.

9 Claims, 2 Drawing Sheets

U.S. PATENT DOCUMENTS

| | | |
|---|---|---|
| 5,078,452 A | 1/1992 | Tilly et al. |
| 5,123,707 A * | 6/1992 | Wurzell ..................... 297/464 |
| 5,255,958 A * | 10/1993 | Frischmann ............... 297/464 |
| 5,370,440 A | 12/1994 | Rogala |
| 5,551,616 A * | 9/1996 | Stitt et al. .................. 224/275 |
| 5,971,487 A * | 10/1999 | Passehl ...................... 297/464 |
| 6,022,072 A * | 2/2000 | Moyer ........................ 297/182 |
| 6,024,411 A | 2/2000 | Pesta et al. |
| 6,142,574 A * | 11/2000 | Alexander ................. 297/464 |
| 6,260,903 B1 * | 7/2001 | von der Heyde ......... 296/24.46 |
| 6,565,138 B2 | 5/2003 | Sparrer |
| 6,817,645 B2 | 11/2004 | Taguchi et al. |
| 6,962,382 B2 * | 11/2005 | Scarlett ..................... 296/24.46 |
| 6,971,713 B2 * | 12/2005 | Yuhki et al. ................ 297/113 |

* cited by examiner

SIDE SHIELD FOR MOTOR VEHICLE SEAT ASSEMBLY

FIELD OF THE INVENTION

The invention relates to seat assemblies for motor vehicles. More particularly, the invention relates to a cover or side shield having a rigid and elastomeric portions covering a portion of a gap between adjacent seat backs of a seat assembly.

BACKGROUND OF THE INVENTION

Automotive vehicles typically include rigid plastic covers for covering exposed metal, gaps or other unsightly surfaces in the vehicle interior. Seat assemblies, for example, typically a plurality of plastic injection molded side covers for covering various areas of the seat assembly, such as along a side of a cushion, ends of a track or adjustment knobs, and over or around openings. The shape of such areas to be covered, particularly on a seat assembly, can be complex and/or require multiple covers. It remains desirable to provide improved cover designs that maintain desired outer appearances while covering exposed metal, gaps or other unsightly surfaces in the vehicle interior and, at the same time, address such issues as pinching and/or discomfort felt by the occupant while sitting on the seat assembly. It also remains desirable to reduce the number of covers used in a seat assembly to reduce assembly time and overall production costs.

SUMMARY OF THE INVENTION

According to one aspect of the invention, a cover is provided for concealing a portion of a gap formed between an adjacent pair of seat backs of a motor vehicle seat assembly. The cover includes a substantially rigid portion and a substantially flexible portion. The flexible portion of the cover has first and second flanges that extend outwardly from opposite sides of the substantially rigid portion for concealing a portion of the gap between the seat backs of the seat assembly.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
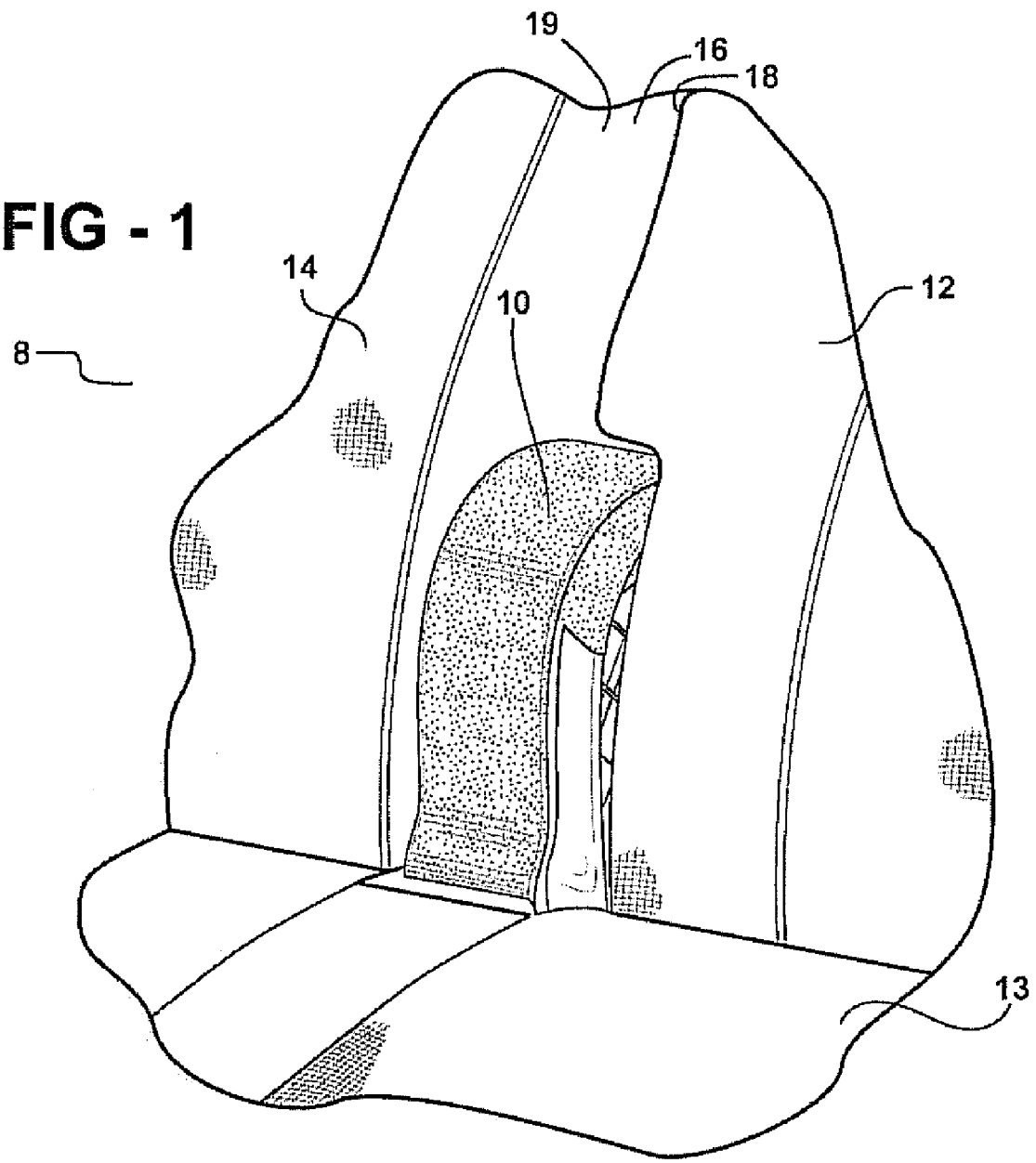
FIG. 1 is an enlarged partial view of a seat assembly highlighting a cover according to one embodiment of the invention for covering an area between adjacent seat backs of the seat assembly.

Referring to FIG. 1, a motor vehicle seat assembly according to one embodiment of the invention is generally indicated at 8. The seat assembly 8 includes a cushion 13 for supporting an occupant above a floor. The seat assembly 8 also includes a first seat back 12 and a second seat back 14 each capable of supporting a torso of the occupant seated on the seat cushion 13. At least one of the seat backs 12, 14 is pivotally coupled to the cushion 13 for movement between a plurality of back support positions and/or a forwardly folded flat position.

Each seat back 12, 14 includes a side surface 18, 19. The side surfaces 18, 19 of the seat backs 12, 14 face each other and are generally parallel to each other. A gap 16 is formed between the side surfaces 18, 19 of the seat backs 12, 14 due largely to the at least one of the seat backs 12, 14 being pivotally coupled to the seat cushion 13. Described in greater detail below, the seat assembly 8 includes a side shield or cover 10 for concealing a lower area of the gap 16.

Figure 2:
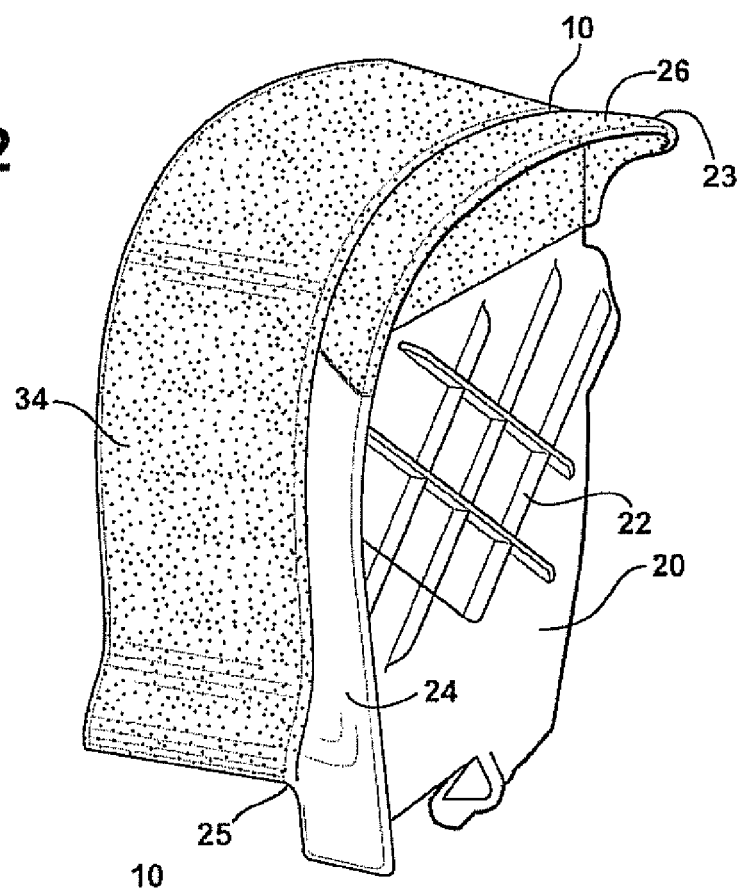
FIG. 2 is a front perspective view of a first side of the cover of FIG. 1.
Figure 3:
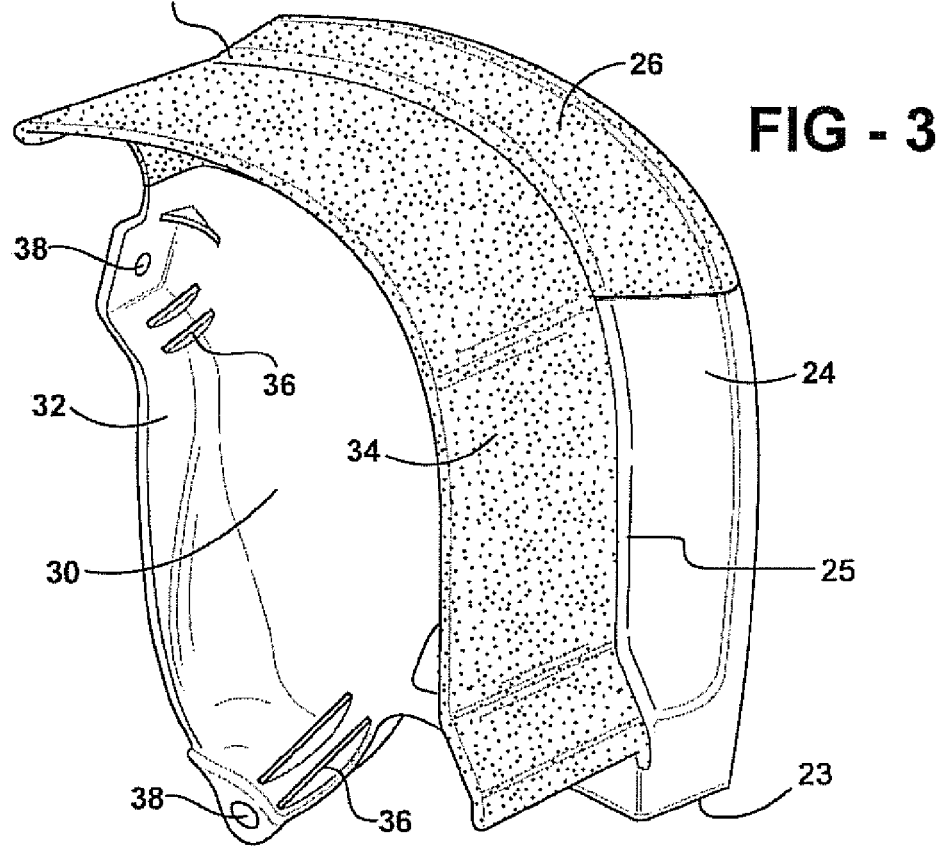
FIG. 3 is a front perspective view of a second side of the cover of FIG. 1.

Referring to FIGS. 2-3, the cover 10 includes a main wall 20 that is generally parallel with the side surfaces 18, 19 of the seat backs 12, 14. A rib lattice 22 is integrally formed on at least one side of the main wall 20 to reinforce the cover 10.

A first flange 23 extends arcuately along a leading edge 25 of the main wall 20. The first flange 23 is generally orthogonal to the main wall 20. The first flange 23 extends toward the side surface 18 of the first seat back 12. A bottom portion 24 of first flange 23 is integrally formed with the main wall 20. The main wall 20 and the bottom portion 24 of the first flange 23 are substantially rigid. The main wall 20 and the bottom portion 24 of the first flange 23 may be formed of any suitable plastic material and formed, for example, in an injection molding process.

An upper portion 26 of the first flange 23 is formed of a different material than the bottom portion 24 of the first flange 23. More specifically, the upper portion 26 of the first flange 23 is formed from a flexible material. In one embodiment, the upper portion 26 is formed of an elastomeric or rubber material, so as to be flexible relative to the substantially rigid portions of the cover 10, i.e. the main wall 20 and the bottom portion 24.

A second flange 34 extends arcuately along the leading edge 25 of the main wall 20. The second flange 34 is generally orthogonal to the main wall 20. The second flange 34 extends toward the side surface 19 of the second seat back 14. In one embodiment, the second flange 34 is formed of an elastomeric or rubber material, so as to be flexible relative to the bottom portion 24 of the first flange 23 and the main wall 20. In another embodiment, the upper portion 26 of the first flange 23 and the second flange 34 are integrally formed from the same flexible material.

The relatively flexible portions of the cover 10, i.e. the upper portion 26 of the first flange 23 and the second flange 34, may be formed integrally with the substantially rigid portions 20, 24 of the cover 10 in a two-shot injection molding process, in which the substantially rigid portions 20, 24 of the cover 10 are formed in one part of an injection molding tool using a resin or plastic material and the relatively flexible portions 26, 34 of the cover 10 are formed in a subsequent step in the same injection molding tool using a flexible elastomeric or rubber based material. Alternatively, the rigid 20, 24 and flexible 26, 34 portions of the cover 10 may be formed separately and assembled in a subsequent assembly step, such as by fasteners or heat staking.

The rigid portion 20, 24 of the cover 10 may also include a third flange 32 extending generally orthogonally from the main wall 20. The third flange 32 may include mounting holes 38 for mounting the cover 10 to other components of the seat assembly 10, such as the seat cushion 13. The cover 10 may also include ribs 36 for minimizing flexing of the third flange 32 relative to the main wall 20.

By this arrangement, the first 23 and second 34 flanges conceal portions of the gap associated with respective seat backs 12, 14, thereby eliminating the need for individual conventional covers that are otherwise typically used for covering the same portions of the gap. Further, the flexible portions 26, 34 of the cover 10 flex to prevent pinching of or uncomfortable hard points being felt by the occupant.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A cover for concealing a portion of a gap formed between an adjacent pair of seat backs of a motor vehicle seat assembly, said cover comprising:
   a substantially rigid portion having a generally upright main wall having a generally arcuate leading edge; and
   a substantially flexible portion having first and second flanges extending outwardly from opposite sides of the leading edge for concealing a portion of the gap between the seat backs of the motor vehicle seat assembly.

2. The cover as set forth in claim 1, wherein the first and second flanges extend generally arcuate along the leading edge of the main wall.

3. A cover for concealing a portion of a gap formed between an adjacent pair of seat backs of a motor vehicle seat assembly, said cover comprising:
   a substantially rigid portion having a generally upright main wall; and
   a substantially flexible portion having first and second flanges extending outwardly from opposite sides of the main wall for concealing a portion of the gap between the seat backs of the motor vehicle seat assembly,
   wherein a bottom portion of the first flange is substantially rigid and integral with the main wall.

4. The cover as set forth in claim 3, wherein an upper portion of the first flange is flexible relative to the bottom portion of the first flange.

5. The cover as set forth in claim 4, wherein the second flange is flexible relative to the main wall.

6. The cover as set forth in claim 5, wherein the second flange is integrally formed with the upper portion of the first flange from an elastomeric or rubber based material.

7. The cover as set forth in claim 6, wherein the first and second flanges are generally orthogonal relative to the main wall.

8. The cover as set forth in claim 1, wherein the main wall includes integral ribs for reinforcing the cover.

9. A cover for concealing a portion of a gap formed between an adjacent pair of seat backs of a motor vehicle seat assembly, said cover comprising:
   a substantially rigid portion having a generally upright main wall; and
   a substantially flexible portion having first and second flanges extending outwardly from opposite sides of the substantially rigid portion for concealing a portion of the gap between the seat backs of the motor vehicle seat assembly,
   wherein the substantially rigid portion has a third flange adapted to be fixedly secured to the seat assembly, the third flange being generally orthogonal relative to the main wall,
   wherein the substantially rigid portion includes a plurality of ribs interconnecting the main wall and the third flange.

\* \* \* \* \*